United States Patent Office 2,727,992
Patented Dec. 20, 1955

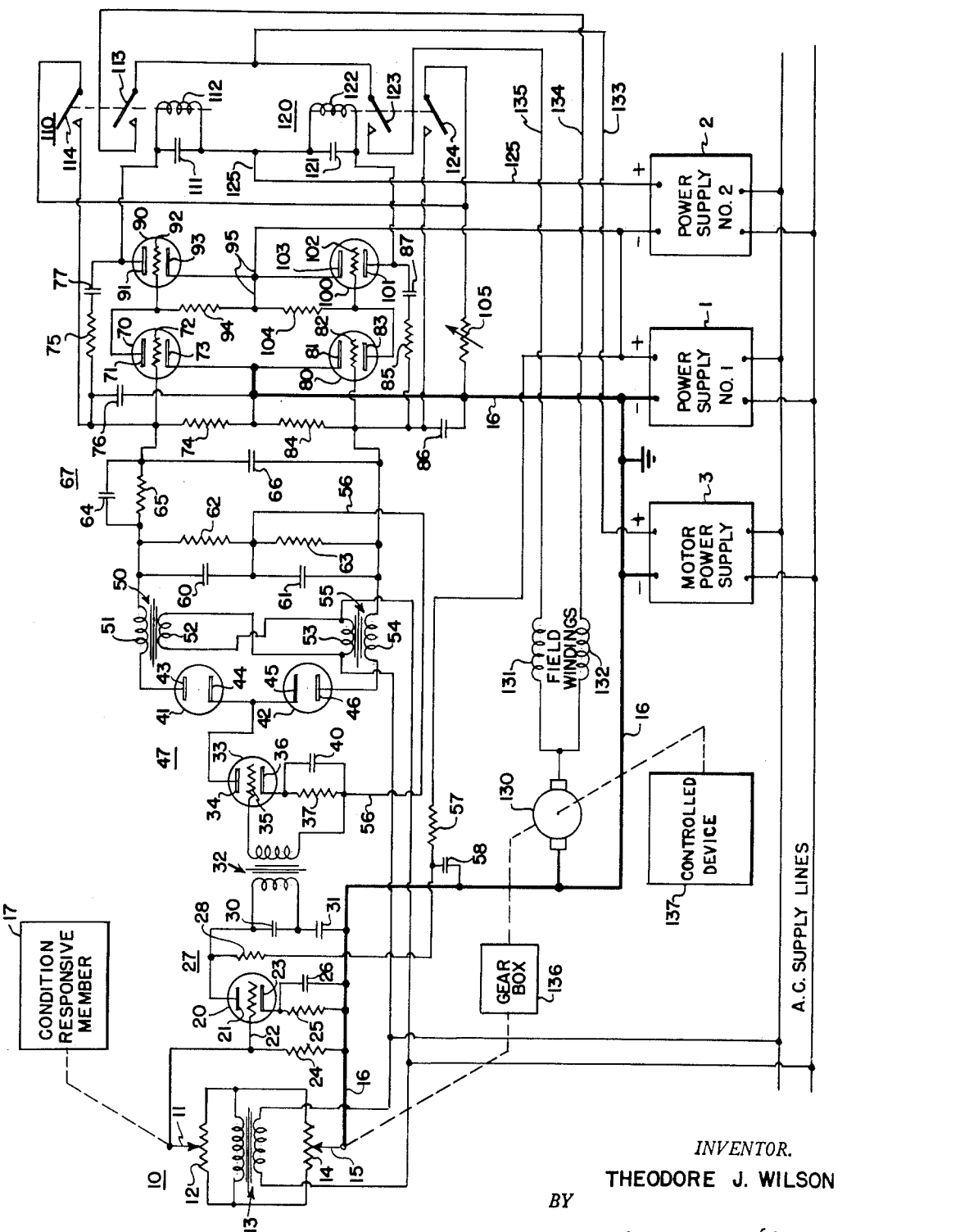

2,727,992

ELECTRONIC CONTROL CIRCUITS

Theodore J. Wilson, Minneapolis, Minn., assignor to Minneapolis-Honeywell Regulator Company, Minneapolis, Minn., a corporation of Delaware Application December 29, 1952, Serial No. 328,287

6 Claims. (Cl. 250—27)

This invention relates to electronic control circuits, and particularly to a type of control system wherein a device is controlled in accordance with an electrical signal produced by means responsive to a controlling condition.

An object of the invention is to provide an improved amplifier circuit for use in a control system which responds to a variable condition and wherein the load device is operated intermittently or continuously depending on the magnitude of the variable condition.

A further object of the invention is to provide an improved fast rate pecking control system for use in antihunting rebalancing systems.

Another object of the invention is to combine a directly coupled relay output circuit and a control system where a circuit operated by the relay is effective to change the sensitivity of the control system in a way tending to cause intermittent operation of the relay.

Other objects and advantages of the invention will become apparent from the following description and the accompanying drawing.

The A.-C. bridge circuit 10 is energized from the A.-C. supply line through a transformer 13. The bridge circuit 10 is composed of two potentiometers 12 and 14 with the A.-C. energizing voltage applied to the ends of the paralleled potentiometers. Sliding contacts 11 and 15 respectively of potentiometers 12 and 14 are the output terminals of the bridge circuit. A condition responsive member 17 coupled to slider 11 moves the slider along potentiometer 12 in response to condition changes thus unbalancing the bridge. Slider 11 is connected to the input of amplifier stage 27. Slider 15 of potentiometer 14 is electrically grounded, and is mechanically coupled through a gear box 136 to a motor 130. The rotation of the motor 130 moves slider 15 rebalancing the bridge circuit.

Amplifier stage 27 includes an electronic discharge device 20 shown as a triode. The triode 20 includes an anode 21, a cathode 23, and a control electrode 22. An input impedance 24 is connected from the control electrode 22 to ground. A cathode resistor 25 and a by-pass capacitor 26 are connected from cathode 23 to ground. Anode 21 is connected to a power supply 1 through load resistor 28 and a decoupling network consisting of resistor 57 and capacitor 58. A transformer 32 provides the coupling between the output of amplifier stage 27 and the input to the discriminator circuit 47. Phase sensitive discriminator circuit 47 includes three electronic discharge devices shown here as a triode 33, and two diodes 41 and 42. The triode 33 includes an anode 34, a control electrode 35, and a cathode 36. In the cathode circuit is a resistor 37 and a by-pass capacitor 40 in parallel. Diode 41 includes an anode 43 and a cathode 44, and diode 42 includes an anode 46 and a cathode 45. The diodes 41 and 42 receive their anode potentials from transformers 50 and 55 respectively, the secondary winding 51 of transformer 50 being in the anode circuit of diode 41, and the secondary winding 54 of transformer 55 being in the anode circuit of diode 42. The primary windings 52 and 53 of transformers 50 and 55 are energized from the A.-C. supply line and are so connected that the potentials applied to the anodes 43 and 46 are opposite in phase. The current path of diode 41 is from the transformer secondary winding 51, to anode 43, cathode 44 of diode 41, to the anode 34 of triode 33, cathode 36, cathode resistor 37, lead 56, load resistor 62 and back to the winding 51. The current path of diode 42 is similar, from the transformer winding 54, to anode 46 of diode 42, cathode 45, then to anode 34 of triode 33, cathode 36, cathode resistor 37, lead 56, load resistor 63, and back to the winding 54. Diodes 41 and 42 are essentially half-wave rectifiers, their conduction being dependent on the conduction of triode 33. Thus a signal potential applied to the control electrode 35 unblocks triode 33 allowing one or the other of the diodes to conduct depending on the sense and magnitude of the input signal. The load resistors 62 and 63 in the output of the discriminator circuit are in series having the output of diode 41 developed across load resistor 62 and the output of diode 42 developed across load resistor 63. Capacitors 60 and 61 are filters with capacitor 60 in parallel with resistor 62 and capacitor 61 in parallel with resistor 63. The signal potential is then impressed through an integrating rate circuit 67 including resistor 65 and capacitor 64 in parallel and capacitor 66, with the opposite terminals of capacitor 66 connected to the control electrodes of the following stage. As will be explained later, the signal potentials from the discriminator 47 are thus applied to the control electrode 72 of triode 70 and in a reversed phase to the control electrode 82 of triode 80.

The three power supplies 1, 2 and 3 all supply D.-C. power as indicated on the diagram and they may be any of the well known types of power supplies including rectifiers and the necessary filtering circuits. The right hand terminals of all three power supplies are of a positive polarity with respect to their left hand terminals as is shown in the diagram.

The output section of this device is divided into two sections, the upper branch including two triodes 70 and 90 and the lower branch including triodes 80 and 100. In the upper branch, triode 70 includes an anode 71, a control electrode 72, and a cathode 73 which is grounded. The input impedance to triode 70 includes resistance 74 and capacitance 76 connected in parallel from the control electrode 72 to ground. The anode 71 is directly connected to the control electrode 92 of the succeeding triode 90. A resistor 94 connected between the control electrode 92 and a cathode 93 of triode 90 is also the load resistor in the anode circuit of triode 70 and while triode 70 conducts, the potential drop across resistor 94 biases triode 90 essentially to cut off. The cathode 93 of triode 90 is tied to the cathode 103 of triode 100, and coupled through lead 95 to the negative terminal of power supply 2. Power supply 1 and power supply 2 are in series having the negative terminal of power supply 2 connected to the positive terminal of power supply 1. In the anode circuit of triode 90 is a positive feedback loop including capacitor 77 and resistor 75 in series connecting back to the control electrode of triode 70. Also included in the anode circuit of the output triode 90 is a relay winding 112 of relay 110. The current path of triode 90 is from the positive terminal of power supply 2, lead 125, relay winding 112, to anode 91, cathode 93, and lead 95 to the negative terminal of the power supply 1.

The relay 110 as shown in the diagram has two pair of contacts, one pair of contacts 113 when closed applies power to energize the motor 130 through field winding 131. The other pair of contacts 114 connects a variable impedance 105 in parallel with the input impedance of triode 70, thus changing the input impedance of triode 70 while the relay contacts 114 are closed.

The lower branch of the output section is similar to the upper with triode 80 including an anode 83, a control electrode 82, and a cathode 81 which is grounded. The input impedance to triode 80 includes resistance 84, and capacitance 86 connected in parallel from the control electrode 82 to ground. The anode 83 is directly connected to the control electrode 102 of the succeeding triode 100. A resistor 104 connected between the control electrode 102 and the cathode 103 of triode 100 is also the load resistor in the anode circuit of triode 80 and while triode 80 conducts, the potential drop across resistor 104 biases triode 100 essentially to cutoff. The cathode 103 of triode 100 is coupled through lead 95 to the negative terminal of power supply 2. In the anode circuit of the output triode 100 is a positive feedback circuit to the control electrode 82 of triode 80, including a resistor 85 and a capacitor 87 connected in series. Also included in the anode circuit of the triode 100 is a relay winding 122 of relay 120. The current path of triode 100 is from the positive terminal of power supply 2, lead 125, relay winding 122, to anode 101, cathode 103, and lead 95 to the negative terminal of the power supply 2.

The relay 120 as shown in the diagram has two pair of contacts. One pair of contacts 123 when closed, applies power to the motor 130 through field winding 132 to run the motor in the reverse direction from that when relay 110 is energized. The other pair of contacts 124 connects variable impedance 105 in parallel with the input impedance of triode 80, thus changing the input impedance to triode 80 while the relay 120 is energized.

The motor 130 has two field windings 131 and 132 and the motor will run in one direction or another depending upon which winding is energized. The motor is mechanically coupled to a condition control device and to a gear box 136. Gear box 136 is mechanically coupled to slider 15 of the rebalancing potentiometer 14.

The heater filaments (not shown) of the electronic discharge device may be connected to any suitable source of electrical energy.

The following table gives values of the various resistances and condensers of the diagram which have been used in one embodiment of that circuit:

| Reference character: | | Quantity |
|---|---|---|
| 12, 14 | ohm potentiometers | 500 |
| 24 | ohms | 10,000 |
| 25 | do | 500 |
| 28, 37 | do | 50,000 |
| 57 | do | 20,000 |
| 62, 63 | do | 250,000 |
| 65 | megohm | 1 |
| 74, 84 | ohms | 500,000 |
| 75, 85 | megohms | 2 |
| 94, 104 | do | 1 |
| 105 | megohm potentiometer | 5. |
| 26, 40, 58 | microfarads | 10. |
| 30 | do | .005 |
| 31 | do | .05 |
| 60, 61 | do | .5 |
| 64 | do | 20. |
| 66 | do | 1.0 |
| 76, 86 | do | .02 |
| 77, 87 | do | .0015 |
| 111, 121 | do | .6 |

*Operation*

When sliders 11 and 15 are in a position as shown in the diagram the bridge network 10 is balanced and no signal potential is impressed on the control electrode 22 of the amplifier stage 27. Under these conditions, neither of the relays 110 or 120 is energized hence the motor 130 which controls the condition control device and the rebalancing slider 15 is not energized and therefore remains stationary.

A change in condition is sensed by the condition responsive member 17, which unbalances A. C. bridge 10 by moving sliding contact 11 of potentiometer 12. A signal from the unbalanced bridge 10 is fed to the input of amplifier 27, is amplified and impressed on the input of phase sensitive discriminator circuit 47. As previously explained, alternating potentials opposite in phase are applied to the anodes 43 and 46 of diodes 41 and 42 through transformers 50 and 55. With no input signal applied to the control electrode 35 of triode 33 the diodes will be able to conduct very little current since the triode 33 is in the cathode circuit of the diodes and as soon as one of the diodes begins to conduct the triode becomes self biased to cut off because of the potential drop developed across cathode resistor 37. Now let us assume the potential at the anode 43 of diode 41 becomes positive at the same time the control electrode 35 of triode 33 is driven positive by a signal potential. Current then flows from the winding 51 of transformer 50 to anode 43 of diode 41, cathode 44, anode 34 of triode 33, to cathode 36, cathode resistor 37, through lead 56, load resistor 62 of diode 41 and back to the transformer winding 51. At the time diode 41 is conducting, diode 42 is not conducting since the potential of anode 46 is negative. As the potential at anode 46 of diode 42 becomes positive, the diode 42 is still essentially unable to conduct current since the signal potential on control electrode 35 of triode 33 is now negative driving triode 33 into cut off effectively opening the cathode circuit of diode 42. If the input signal potential were of the opposite sense diode 42 would be able to conduct and diode 41 would be essentially non-conducting.

The signal has now been rectified due to the conduction of one or the other of the diodes, depending on the sense of the input signal. Assuming diode 41 was conducting the resultant rectified D. C. signal is developed across load resistor 62. The signal is then impressed through rate network 67, and the resultant potential built up across capacitor 66 is applied in opposite senses to the control electrodes 72 and 82 of electronic discharge devices 70 and 80. With no signal potential applied to the input of triodes 70 and 80 they both conduct current developing sufficient potential across load resistors 94 and 104 to maintain the control electrodes 92 and 102 of output triodes 90 and 100 sufficiently negative with respect to the cathodes 93 and 103 respectively, to keep the triodes 90 and 100 essentially non-conducting. When an input signal is applied to the control electrodes of triodes 70 and 80, one of the control electrodes will be driven in a more positive direction increasing the conduction of that stage while the second control electrode will be driven in a negative direction decreasing the conduction of the second stage. Let us assume that the control electrode 72 of triode 70 is driven in a positive direction increasing the conduction of the stage thus increasing the potential drop developed across resistor 94 and biasing triode 90 further into cutoff. Control electrode 82, however, of triode 80 is driven in a negative direction reducing the current conduction of the stage, thus decreasing the potential drop developed across load resistor 104, reducing the bias on triode 100 and allowing triode 100 to begin conducting. The positive feedback loop of capacitor 87 and resistor 85 to the control electrode 82 aids the initiating signal. The current path for electronic discharge device 100 is from the positive terminal of power supply 2, lead 125, relay winding 122 of relay 120, anode 101 of triode 100, cathode 103 and lead 95 back to the negative terminal of power supply 2. The conduction of electronic discharge device 100 causes current flow through winding 122 of relay 120 energizing the relay and closing contacts 123 thus applying power to the motor 130 from the motor power supply, lead 133, relay contacts 123, lead 135, field winding 131 and motor 130 to ground. Motor 130 will thus be energized causing it to rotate to reposition condition control device 137 and move slider 15 of potentiometer 14 to rebalance the system.

When relay 120 is energized contacts 124 also close, placing variable resistor 105 in parallel with the input impedance, including resistor 84 and capacitor 86, of the initiating stage 80 which had its control electrode 82 driven in a negative direction by the signal input potential. The result of the shunting of the input impedance by impedance 105 is to decrease the effective input impedance of triode 80, and an unbalance of the input impedance of the triodes 70 and 80 results. This causes a larger amount of the signal potential on the capacitor 66 to be developed across the input impedance of triode 70 and a smaller amount across the shunted impedance of triode 80; since control electrode 82 was driven in a negative direction by the input signal it now becomes less negative due to the decreased signal and as capacitor 86 discharges the conduction of triode 80 increases, cutting off triode 100 and thus deenergizing relay 120 which then opens. Capacitor 121 which is connected in parallel with relay winding 122 discharges through the winding and maintains the relay energized for a specified time after the triode 100 is cut off. The triode 80 will remain in this state of operation until the capacitor 86 in parallel with resistor 84 has had time to recharge sufficiently so the negative signal potential can again affect the conduction of triode 80, reducing the conduction of the triode 80, allowing output triode 100 to conduct and again pull in relay 120 thus repeating the cycle. This pecking action will continue until the motor 130 has rotated sufficiently to move sliding contact 15 on the rebalancing potentiometer 14 far enough to rebalance the system.

If the input signal is of sufficient magnitude the signal will be able to override the pecking action of the amplifier and the relay will stay in. The amount of signal required to make the relay stay in can be varied by the adjustment of resistor 105.

If the signal potential applied across capacitor 66 is of the opposite sense as that described, the current through triode 70 will be reduced allowing output triode 90 to conduct thus energizing relay 110 and closing contacts 113 and 114. Closing contacts 113 applies power to the motor 130 through the opposite field winding 132 causing the motor to rotate in the opposite direction as that explained previously. Contacts 114 connect variable impedance 105 in parallel with the input impedance of triode 70 and the resultant pecking action is similar to that followed previously for triode 80 since both the upper and lower output circuits are identical in construction.

Since impedance 105 is variable the pecking rate of the amplifier can be varied, since changing the value of the impedance 105 changes the time constant of the input circuits of triodes 70 or 80.

I have now shown and described an improved amplifier circuit for use in a rebalancing control system in which the relays operated by the amplifier control a circuit which changes the sensitivity of the amplifier to cause a pecking action of the relays and thus prevent hunting in the system. While I have shown and described certain preferred embodiments of my invention, other modifications will occur to those skilled in the art and therefore I wish my invention to be limited only by the appended claims.

I claim as my invention:

1. Control apparatus, comprising in combination: a pair of normally conductive first electronic discharge devices; a pair of second electronic discharge devices directly connected in the output circuits of said first discharge devices, and means for holding each of said second discharge devices essentially non-conductive by the conduction of the respective first discharge device; a source of direct current potential connected to energize said electronic discharge devices; a pair of relays connected in the output circuits of said second discharge devices, each of said relays being responsive to and energized by the conduction of the respective second discharge device; impedance means having a separate portion thereof connected in the input circuit of each of said first discharge devices, said impedance means being adapted to have a signal potential developed across it; circuit means associated with said relays where upon energization of one of said relays in response to a signal potential the magnitude of said portion of said impedance means connected in the input of the corresponding first discharge device is changed, thus causing the corresponding first discharge device to become more conductive, and tending to cause the corresponding second discharge device to become non-conductive de-energizing said relay; and means for holding said relay energized for a specified time.

2. Control apparatus, comprising in combination: a pair of normally conductive first electronic discharge devices; a pair of second electronic discharge devices directly connected in the output circuits of said first discharge devices, and means for holding each of said second discharge devices essentially non-conductive by the conduction of the respective first discharge device; a source of direct current potential connected to energize said electronic discharge devices; a pair of relays connected in the output circuits of said second discharge devices, each of said relays being responsive to and energized by the conduction of the respective second discharge device, and capacitor means associated with said relay means for holding said relay means energized for a specified time thus establishing a minimum on-time of the relay means; impedance means having a separate portion thereof connected in the input circuit of each of said first discharge devices, said impedance means being adapted to have a signal potential developed across it; and circuit means associated with said relays such that upon energization of one of said relays the magnitude of said portion of said impedance means connected in the input of the corresponding first discharge device is changed, thus causing the corresponding first discharge device to become more conductive, and tending to cause the corresponding second discharge device to become non-conductive de-energizing said relay, said circuit means including a variable impedance placed in parallel with said portion of said impedance of the corresponding first discharge device for regulating the amount of change in magnitude of said portion of said impedance means upon energization of said relay thus allowing a variation of the pecking rate of the relay.

3. Control apparatus comprising in combination: a pair of normally conductive first electronic discharge devices, said discharge devices having input and output circuits; a source of direct current potential; first circuit means including said output circuits connecting said source to said pair of devices for energizing said devices therefrom; a pair of second electronic discharge devices, said second discharge devices directly connected in the output circuits of said first discharge devices; a pair of relay means connected in the output circuits of said second discharge devices, each of said relays being energized by the conduction of the respective second discharge device; means for producing a direct current signal potential of reversible sense for selectively controlling said relays; first impedance means having a separate portion thereof connected in the input circuit of each of said first discharge devices; means connecting said signal potential means to said impedance means so that signals of opposite polarity are applied to each of said first pair of discharge devices; second impedance means; and second circuit means for connecting said second impedance means in parallel with only one of said portions of said first impedance means upon energization of one of said relays to cause intermittent operation of said relay means.

4. Control apparatus comprising in combination: a pair of relay means; a pair of amplifier means responsive to an electrical signal potential for energizing one or the other of said relay means in accordance therewith; a source of direct current potential connected to energize said pair of amplifier means; first impedance means having a portion thereof connected in the input circuit of each of said amplifier means; means for producing a direct current signal potential of reversible sense; circuit means for connecting said signal producing means to said impedance means so that signals of opposite polarity are applied to said amplifier means; and second impedance means connected in parallel with one or the other of said portions of said first impedance means upon energization of one or the other of said relay means, respectively, to cause intermittent energization of said relay means.

5. Control apparatus comprising in combination: discriminating means selectively responsive to input signal potentials of one sense or the other to produce an output potential of one polarity or the other depending on the sense of the input signal comprising an electronic discharge device having an anode, a cathode and a control element, a pair of diodes having their cathodes connected directly to said anode, and circuit means for connecting the anodes of said diodes to a source of alternating power and to the cathode of said electronic discharge device; a pair of relay means; a pair of amplifier means responsive to the output potential of said discriminating means for energizing one or the other of said relay means depending on the polarity of said output potential; a source of direct current potential connected to energize said pair of amplifier means; first impedance means having a portion thereof connected in the input circuit of each of said amplifier means, said impedance means being connected to said discriminating means; and second impedance means connected in parallel with one or the other of said portions of said first impedance upon energization of one or the other of said relay means to cause intermittent energization of said relay means.

6. Control apparatus comprising in combination: relay means; a normally conductive first electronic discharge device having a plurality of electrodes including an anode, a cathode and a control member; a second electronic discharge device connected to said relay to control the energization thereof and having an anode, a cathode and a control member, said control member of said second discharge device being directly connected to said anode of said first discharge device; a source of direct current potential connected to energize said discharge devices; impedance means having one terminal thereof connected to the control member of said first discharge device and a second terminal connected to said cathode of said first discharge device; means for producing a direct current signal potential of reversible polarity; circuit means for connecting said signal producing means across said impedance means; second impedance means; capacitor delay means connected across the control electrode and the cathode of said first discharge device; and means rendered effective upon energization of said relay for connecting said second impedance means in parallel with said first named impedance means and with said capacitor delay means, to tend to cause de-energization of said relay means to cause intermittent energization of said relay means, said capacitor delay means also providing a delay in the effect of said second impedance means on connection and disconnection of said second impedance means in parallel with said first named impedance means.

References Cited in the file of this patent

UNITED STATES PATENTS

| 2,425,733 | Gille | Aug. 19, 1947 |
| 2,468,791 | Thomson | May 3, 1949 |
| 2,629,826 | McIlvaine | Feb. 24, 1953 |